United States Patent Office 3,421,617
Patented Jan. 14, 1969

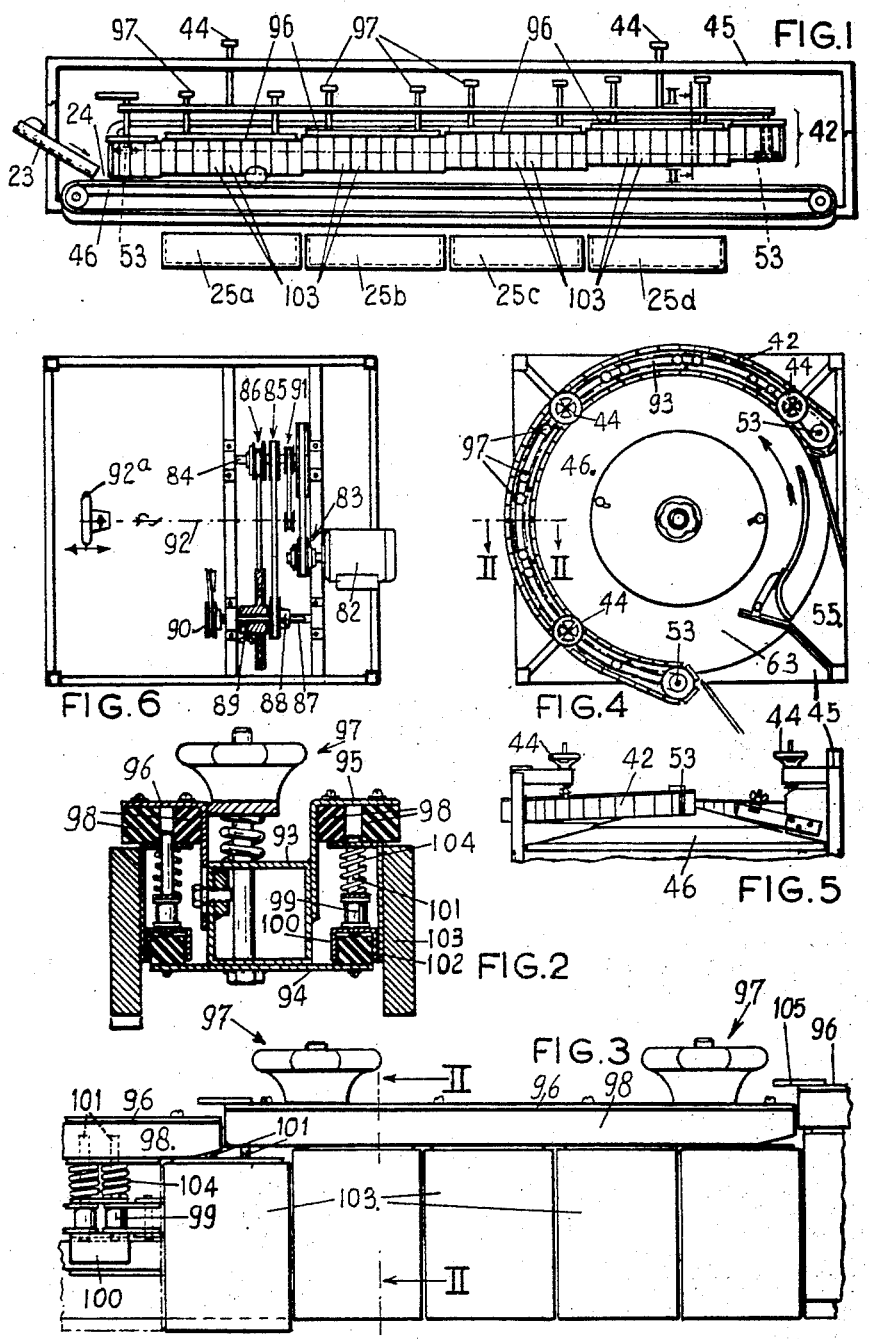

3,421,617
DEVICE FOR SORTING IN SIZE AGRICULTURAL OR HORTICULTURAL PRODUCTS
Jan A. de Greef, De Hoekenburg 2, Tricht, Netherlands
Filed Nov. 8, 1966, Ser. No. 592,889
U.S. Cl. 209—97
Int. Cl. B07c 5/04; B07c 1/10
1 Claim

ABSTRACT OF THE DISCLOSURE

A fruit sorting device having cooperating members of gradually increased spacing. One of the members is composed of a plurality of measuring means guided at an adjusted height above the other member along a stepped path.

---

The invention relates to a device for sorting in size agricultural or horticultural fruits, comprising a frame, a driven conveying member mounted for movement in said frame and further comprising a driven measuring bar supported by said frame through guide members, wherein said measuring bar extends above at least part of the conveying member and is adapted to be adjusted with respect to said conveying member so that it is spaced from the conveying member at a height increasing in the direction of movement of the conveying member from a supply place for supplying fruits to the conveying member along and beyond a plurality of delivery places for delivering fruits from the conveying member, said conveying member and said measuring bar forming together an uninterrupted chute for the fruits.

The conveying member and the measuring bar of the known device of the above mentioned kind each consist of a driven endless belt. The space between the co-operating flights of these belts increases gradually, so that each fruit being just small enough to slip at a given delivery place through the space between said flights is given the opportunity to do so only during a very short time.

It is the object of the invention to give each fruit being just small enough to slip at a given delivery place through said space the opportunity to do so during a longer period.

It is a main object of the invention to provide a new device for sorting fruits, in which the measuring bar driven at an adjusted height above the conveying member is composed of a plurality of measuring members guided by the guide members at an adjusted height above the conveying member along a stepped path, said measuring members forming a substantially uninterrupted endless elongated member. The conveying member of this device may be formed either by an endless conveying belt having straight flights or by a disc or cone mounted for rotation in a frame about an axis directed downwards.

Other features of the present invention will be readily apparent from the following description of several embodiments of a sorting device according to the invention made with reference to the accompanying drawings. Said drawings show schematically in:

FIG. 1 a side view of a sorting device according to the invention;

FIG. 2 on larger scale a cross section along the line II—II of FIG. 1;

FIG. 3 a side view, a part of which is removed, said side view showing a part of the measuring bar of the device of FIG. 1, which measuring bar is also applied in the device of FIG. 4;

FIG. 4 a top view of another embodiment of the device according to the invention;

FIG. 5 a side view of the device of FIG. 4 and

FIG. 6 a top view of a gearing particularly suitable for each of the above mentioned sorting devices according to the invention.

The sorting device of FIGS. 1, 2 and 3 mainly consists of a frame 45, a conveying member 46 driven with respect to this frame and a driven measuring bar 42 provided at an adjustable height above the conveying member 46, a supply chute 23 from which the fruits to be sorted are supplied one by one at the supply place 24 onto the upper surface of the conveying member 46 and a plurality of boxes 25a, 25b, 25c, 25d disposed behind each other at the side of the conveying member 46 and on a lower level.

The measuring bar 42 is formed by an endless band guided on both sides of a mainly straight beam 93. The beam 93 is connected adjustably in height to the frame 45 of the sorting device by means of screws 44. With the aid of these screws 44 the height of the measuring band 42 above the conveying member 46 is adjustable.

The guiding of the measuring bar 42 of this device is composed of the following stationary parts:

A hollow beam 93 fixed at the frame, a plate 94 connected to the beam 93 and protruding at both sides thereof, an uninterrupted angle steel 95 joined to the upper side of the beam 93, a number of T-steels 96 connected to the beam at an adjustable height, a number of jacks 97 for adjusting the height of the T-steels 96, two sets of guide strips 98 suspended from the underside of the horizontal flange of the angle steel 95 and from that of the outwards directed flange of each T-steel 96, two guide strips 99 connected to the plate 94 and two chain wheels 53, one at each end of the beam 93.

The moving measuring bar consists of an endless Galls chain 99, each second lower link 100 of which is U-shaped and engages the guide strips 99, pins 101 of said chain 99 protruding beyond the upper link until between the guide strips 98, a great number of angle steels 102 having recesses in their upper flanges, said pins 101 extending through said recesses, an equal number of layers 103 of foam rubber forming a coating of the angle steels 102 and of a number of springs 104 keeping the angle steels pressed against the lower sides of the guide strips 98. The T-steels 96 with the guide strips 98 forming the guide members of the measuring bar are positioned above the conveying member with a stepwise increasing height above it, starting from the supply place, in order to obtain that each of the fruits, depending on its size, can land in only one of the boxes 25a, 25b, 25c or 25d through the space between cone 21 and ring 22 at the respective one of delivery places 29a, 29b, 29c or 29d. The ends of the guide strips 98 remote from the supply place may be beveled a little in order to gradually adjust the height of the angle steels 102 on their way along the ends of the guide strips 98. Each T-steel 96 extends over the width of a delivery place, so that each fruit being just small enough to slip at a given delivery place through the lower edge of the layer 99 of foam rubber and the upper surface of the conveying member is given the opportunity to do so during a longer period. This increases the sorting exactness. Two T-steels 96 can be adjusted at the same height in order to obtain an extra long delivery place for fruits of a given size. This equal adjustment can readily be effected, as a stop 105 is provided at the upper side of the ends of the T-steels 96 facing the supply place.

The means for guiding the measuring bar at the reverse places corresponding with the angle steel 95 and the plate 94 respectively are connected to the beam 93 and are also provided with guide strips.

The conveying member 46 may be formed by an endless belt inclined sideways (FIG. 1) or by a disc or cone mounted for rotation about a vertical axis (FIGS. 4 and 5). When the conveying member is formed by a disc the fruits are driven through the space between the conveying member 46 and the measuring bar 42 by means of centrifugal force. It is a matter of course that the beam 28 of the device of FIG. 1 is mainly straight and that the beam 28 of the device of FIGURES 4 and 5 is curved and extends above the periphery of the rotatable cone.

Quite apart from the difference in the shape of the conveying members and the disposition of the other parts of the devices, said disposition corresponding with the direction of movement of these conveying members the device of FIGURES 4 and 5 resembles that of FIG. 1.

Preferably, above a part of the periphery of the conveying member, viz at the delivery place 63 (FIG. 4) for overmeasured fruits, there is not provided a measuring bar in order to ensure that particularly large fruits leave the conveying member at this place. This sorting device is, just like the above mentioned devices, provided with a supply chute 55 and boxes, not shown.

The sorting operation with each of the above described devices is carried out as follows:

During sorting pears and oblong or other non-rolling fruits, the measuring bar and the conveying member are driven with equal peripheral speeds in the same direction. Depending on the required capacity the peripheral speed is for instance 35–100 m./minute.

During sorting apples or other rolling fruits the measuring bar and the conveying member are again driven in the same direction; viz. the conveying member with a peripheral speed of 35–100 m./minute and the measuring bar with a peripheral speed of 5, 5–15 m./minute. Preferably, the peripheral speed of the conveying member is equal to six and a half times the speed of the measuring bar. In this method according to the invention the capacity of the sorting device is great. Furthermore the fruits automatically roll about their axes extending through crown and stem which results in the fruits being measured over their diameters. The diameter determines the size of the fruit, particularly when fruits of a same type are sorted, which is nearly always the case.

It is remarked that the above mentioned ratio of conveying member speed to measuring bar speed is chosen at a little higher value for sorting more disc like fruits and at a little lower value for sorting more cylinder like fruits, e.g. five and eight respectively.

Each of the above mentioned sorting devices is suitable for carrying out both methods according to the invention, e.g. if they are provided with a drive gearing shown in FIG. 6.

A motor 82 drives, through a rope drive 83, a shaft 84 driving in turn a shaft 87 either through gearing 85 or through gearing 86. By tightening one of the wing nuts 88 respectively 89 either the gearing 85 or the gearing 86 is coupled to the shaft 87. This shaft is connected through the pulley 90 and through other drive means not shown to one of the above mentioned chain wheels 53. The shaft 84 also drives through a gearing 91 a shaft 92 having a keyway, on which later shall 92 a drive pulley 92a coupled thereto by means of a key is slidable in axial direction. This drive pulley 92a, however, can be locked at a determined place against axial movement. This pulley yieldingly acts against the underside of the conveying member and thus drives this member with a speed which is accurately adjustable by the exact choice of the drive radius of the conveying member. In order to sort pears or oblong fruits and in order to sort rolling fruits the gearing 85 respectively the gearing 86 is coupled to the shaft 87. In the sorting device according to the invention the fruits to be sorted are conveyed, instead of along a continuously increasing space, along a stepwise increasing space.

What I claim is:

1. Device for sorting in size agricultural or horticultural fruits, comprising a frame, a driven conveying member mounted for movement in said frame and further comprising a driven measuring bar supported by said frame through guide members wherein said measuring bar extends above at least part of the conveying member and is adapted to be adjusted with respect to said conveying member so that it is spaced from the conveying member at a height increasing in the direction of movement of the conveying member from a supply place for supplying fruits to the conveying member along and beyond a plurality of delivery places for delivering fruits from the conveying member, said conveying member and said measuring bar forming together an uninterrupted chute for the fruits, characterised in that the measuring bar driven at an adjusted height above the conveying member is composed of a plurality of measuring members guided by the guide members at an adjusted height above the conveying member along a stepped path, said measuring members forming a substantially uninterrupted endless elongated member.

References Cited

UNITED STATES PATENTS

| | | | |
|---|---|---|---|
| 826,210 | 7/1906 | Witt | 209—91 |
| 1,182,005 | 5/1916 | Forbes | 209—91 |

M. HENSON WOOD, JR., *Primary Examiner.*

R. A. SCHACHER, *Assistant Examiner.*

U.S. Cl. X.R.

209—102